US012012304B2

(12) United States Patent
Dold

(10) Patent No.: US 12,012,304 B2
(45) Date of Patent: Jun. 18, 2024

(54) PULLEY FOR GUIDING A BELT FOR CARRYING A CAR AND/OR A COUNTERWEIGHT OF AN ELEVATOR SYSTEM

(71) Applicant: Inventio AG, Hergiswil (CH)

(72) Inventor: Florian Dold, Cham (CH)

(73) Assignee: INVENTIO AG, Hergiswil (CH)

( * ) Notice: Subject to any disclaimer, the term of this patent is extended or adjusted under 35 U.S.C. 154(b) by 0 days.

(21) Appl. No.: 17/998,503

(22) PCT Filed: May 17, 2021

(86) PCT No.: PCT/EP2021/062966
§ 371 (c)(1),
(2) Date: Nov. 11, 2022

(87) PCT Pub. No.: WO2021/233816
PCT Pub. Date: Nov. 25, 2021

(65) Prior Publication Data

US 2023/0192446 A1 Jun. 22, 2023

(30) Foreign Application Priority Data

May 18, 2020 (EP) .................................... 20175130

(51) Int. Cl.
*B66B 15/02* (2006.01)
*B66B 15/04* (2006.01)

(52) U.S. Cl.
CPC .............. *B66B 15/02* (2013.01); *B66B 15/04* (2013.01)

(58) Field of Classification Search
CPC ... B66B 15/04; B66B 11/008; B66B 11/0476; B66B 11/08
See application file for complete search history.

(56) References Cited

U.S. PATENT DOCUMENTS

| | | | | |
|---|---|---|---|---|
| 4,981,462 A * | 1/1991 | White, Jr. | F16G 5/20 474/167 |
| 7,882,935 B2 * | 2/2011 | Ach | F16G 5/20 474/261 |
| 8,789,658 B2 * | 7/2014 | Goser | B66B 7/062 474/260 |
| 11,247,870 B2 * | 2/2022 | Valjus | B66B 15/04 |
| 11,427,440 B2 * | 8/2022 | Valjus | B66B 7/062 |
| 2007/0093334 A1 | 4/2007 | Ach | |

FOREIGN PATENT DOCUMENTS

| | | | | |
|---|---|---|---|---|
| CN | 104860177 A * | 8/2015 | D07B 5/006 |
| EP | 3255007 A1 | 12/2017 | |
| WO | 2018166978 A1 | 9/2018 | |

* cited by examiner

*Primary Examiner* — Diem M Tran
(74) *Attorney, Agent, or Firm* — William J. Clemens; Shumaker, Loop & Kendrick, LLP

(57) ABSTRACT

A pulley for guiding a belt for carrying a car and/or a counterweight of an elevator system has a plurality of peripheral, axially spaced channels for receiving ribs of the belt. Each of the channels has two opposing channel flanks for force transmission by frictional engagement with one of the ribs and a peripheral groove between the two channel flanks. A width of the groove is at least 25 percent of an axial spacing of the channels and at least 80 percent of a height of the channels.

18 Claims, 3 Drawing Sheets

PULLEY FOR GUIDING A BELT FOR CARRYING A CAR AND/OR A COUNTERWEIGHT OF AN ELEVATOR SYSTEM

FIELD

The present invention relates to a pulley for guiding a belt for carrying a car and/or a counterweight of an elevator system, to a device provided with such a pulley for carrying a car and/or a counterweight of an elevator system, and to an elevator system having such a device.

BACKGROUND

In the case of elevators having a traction sheave drive, a car and a counterweight may be connected to one another via suspension means such as ropes or belts. Forces between the suspension means and a traction sheave are usually transmitted by frictional engagement. Since the suspension means generally serves both to hold the weight of the car and/or the counterweight and, driven by the traction sheave, to move the car and/or the counterweight, they are also used as suspension traction media, abbreviated as STM).

V-ribbed belts having a plurality of parallel wedge-shaped longitudinal ribs may be used as belts, for example, which are deflected or driven via one or more pulleys having corresponding channels. If such a belt runs into a pulley at an angle, this may result in undesirable noise being generated at smaller diagonal pull angles. With larger diagonal pull angles, the belt may climb out of the channels under certain circumstances.

The behavior of the belt when subjected to diagonal pull, such as its tendency to generate noise or climb, is influenced, among other things, by the geometry of the channel flanks and the surface pressure between the belt and pulley. Experiments have shown that increasing the surface pressure, for example as a result of an increase in the load to be conveyed, may reduce the tendency to generate noise or climb, and that reducing the surface pressure, for example as a result of an increase in the diameter of the pulley, may have the opposite effect.

SUMMARY

Among other things, there may be a need to make a belt drive of an elevator system more robust with respect to loads caused by diagonal pull. In particular, there may be a need to provide a pulley by which contact pressure of the belt may be increased without reducing a diameter of the pulley and/or increasing a tensile load on the belt. Furthermore, there may be a need for a device provided with such a pulley for carrying a car and/or a counterweight of an elevator system, and for an elevator system provided with such a device.

This need may be met by a pulley, a device, and an elevator system according to the advantageous embodiments defined in the following description.

A first aspect of the invention relates to a pulley for guiding a belt for carrying a car and/or a counterweight of an elevator system. The pulley has a plurality of peripheral, axially spaced channels for receiving ribs of the belt. Each of the channels has two opposing channel flanks for force transmission by frictional engagement with one of the ribs. Each of the channels has a peripheral groove between the two channel flanks. A width of the groove is at least 25 percent of an axial spacing of the channels and at least 80 percent of a height of the channels. The channel flanks preferably each form a wedge-shaped profile. The channel flanks run, in particular, in a straight line.

A groove dimensioned in this way may be used to prevent the belt from making loud noises when pulled diagonally. This may also counteract the tendency of the belt to climb out of the channels when pulled diagonally. For example, it may be achieved that the belt only begins to climb at relatively large diagonal pull angles in comparison to a conventional pulley. Another advantage is that the pulley may be incorporated into an existing elevator system without any significant changes, for example without replacing the belt.

The pulley may be a traction sheave or a deflection pulley. A traction sheave is generally driven by a drive machine and actively rotated by it. Traction with the peripheral surface of the traction sheave may thus actively drive, i.e. move, a belt running over this peripheral surface. A deflection pulley, on the other hand, is not connected to a drive machine. Instead, the deflection pulley is passively rotated as the belt running over the peripheral surface of the deflection pulley moves in its longitudinal direction.

A peripheral channel may be understood to mean a recess in a lateral surface of the pulley that extends in the peripheral direction of the pulley. The channels may each be arranged next to one another at a certain axial spacing. The axial spacing may be measured, for example, from the center of the channel to the center of the channel of two adjacent channels. Here, axially means in the direction of an axis of rotation of the pulley. The peripheral channel may have a constant cross section or a constant contour along the circumference of the pulley.

A channel flank may be understood geometrically as a lateral surface of a truncated cone whose cone axis is identical to the axis of rotation of the pulley. Depending on whether a surface line of the truncated cone is straight or curved, the channel flank may be planar or curved, for example concave or convex.

The two channel flanks may face each other. For example, the two channel flanks may be aligned perpendicularly or obliquely to one another in order to form a wedge shape. In particular, the two channel flanks may be mirror-symmetrical with respect to a plane running orthogonally to the axis of rotation of the pulley.

The channels may each have a channel height that is at least as great as a sum of a depth of the groove and a projected height of the channel flanks. This is to be understood as meaning a height that results from the projection of a channel flank onto an axis that is orthogonal to the axis of rotation. In this context, a channel height may be understood to mean a respective radial extension of the channels from a bottom of the groove to an outermost edge of the channels. The bottom of the groove may be interpreted as a channel bottom of the respective channel.

In other words, each of the channels may be divided radially into a first, outer portion and a second, inner portion adjoining the first portion, wherein the first portion comprises the channel flanks and the second portion comprises the peripheral groove.

The groove may form a portion of the channel which is designed as an undercut region in comparison to a portion of the groove delimited by the channel flanks. In other words, the channel may, viewed in cross section, be viewed as consisting of two portions, i.e., of a radially outer portion and a radially inner portion.

The radially outer portion is delimited laterally by the channel flanks. This radially outer portion tapers progressively from radially outside to radially further inside, i.e., the channel flanks are skewed in cross section relative to the axis of rotation of the pulley. Thus, a contact pressure in a direction orthogonal to the axis of rotation of the pulley may be exerted on the channel flanks by ribs of a belt which engage in the channels of the pulley.

The radially inner portion is delimited laterally by wall surfaces of the groove. These wall surfaces are arranged or oriented in such a way that the inner portion formed by the groove acts as an undercut region compared to an entire cross section of the channel. For example, the wall surfaces of the groove may be arranged in the radial direction, i.e., in particular in a plane orthogonal to the axis of rotation of the pulley. In the radially inner portion, the ribs of a belt, which engage in the channels of the pulley, are not in contact with the surface of the channels, or at most with a reduced contact pressure that is significantly lower than the contact pressure exerted on the channel flanks.

Viewed in cross section, an edge may separate the two portions from one another at a transition between the radially outer portion delimited by the channel flanks and the radially inner portion in the region of the groove. The edge may be abrupt or sharp. Alternatively, the edge may also be slightly rounded, in which case a radius of curvature in the region of the edge should be significantly smaller than, for example, a radius of curvature of a channel flank having a curved cross section.

The belt may be a V-ribbed belt or composite V-belt, for example. The belt may have a plurality of parallel ribs running in the longitudinal direction of the belt. The ribs may each be formed with an outer contour adapted to an inner contour of the channels. For example, the ribs may have a wedge or trapezoidal cross section. A respective rib head of the ribs may be rounded or flattened, for example.

A width of the groove may be a measure of an axial extent of the channel, i.e., its extension in the direction of the axis of rotation of the pulley. A depth of the groove may be a measure of a radial extent of the groove, i.e., its extension in a direction orthogonal to the axis of rotation of the pulley.

The groove may have a rectangular cross section, for example. Corners of the cross section may be rounded due to production. Depending on the intended use, the groove may also have a differently shaped cross section. Cross sections of the groove that are in the form of arcs or segments of a circle are possible, for example.

For example, the bottom of the groove may be designed to be planar, i.e., viewed in cross section, substantially in a straight line, for example parallel to the axis of rotation of the pulley. The bottom of the groove may also be shaped differently depending on the application. For example, a groove is possible, the base of which extends in the shape of an arc or a segment of a circle when viewed in cross section.

In principle, the groove serves to prevent the ribs of the belt from resting on the base of the channel. In other words, the grooves together with the ribs may each delimit a cavity when the ribs engage in the channels. It may thus be ensured that frictional forces are transmitted over a defined area, namely over the channel flanks. The groove may also be used to catch abrasion or dirt or to compensate for fluctuations in the thickness of the belt.

By widening the groove with an otherwise unchanged channel profile, the projected height of the channel flanks, and thus a contact surface of the belt, may be reduced. By reducing the contact surface, the contact pressure of the belt increases while the load remains the same, which, as described above, has a favorable effect on the diagonal pull behavior of the belt.

A second aspect of the invention relates to a device for carrying an elevator car and/or a counterweight of an elevator system. The device comprises at least one belt having a plurality of ribs extending in the longitudinal direction of the belt and at least one pulley according to an embodiment of the first aspect of the invention. The pulley is at least partially wrapped around by the belt. The ribs are each received by a channel of the pulley.

A third aspect of the invention relates to an elevator system that comprises a car, a counterweight and a device according to an embodiment of the second aspect of the invention. The elevator car or the counterweight is carried by the at least one belt of the device.

Possible features and advantages of embodiments of the invention may be considered, inter alia and without limiting the invention, to be based upon the concepts and findings described below.

The following dimensions are to be taken as nominal dimensions. Actual dimensions may deviate from the respective nominal dimensions by a specified tolerance amount above and/or below. In the case of the linear dimensions specified below, the tolerance amount may, for example, be in the hundredths of a millimeter range, i.e. be less than 0.1 mm, for example. For the angular dimensions mentioned below, the tolerance amount may be in the tenth of a degree range, for example, i.e. be less than 1 degree, for example.

According to one embodiment, the width of the groove is between 1 mm and 3 mm. Suitable values for the width of the groove are, for example, 1.8 mm, 2 mm or 2.2 mm. However, other values are also possible. The width of the groove may be selected depending on a diameter of the pulley, for example. For example, the width of the groove may be selected to be larger, the larger the diameter of the pulley. As a result, a reduction in the surface pressure due to the increased diameter of the pulley may be compensated.

According to one embodiment, the axial spacing of the channels is between 4 mm and 6 mm. A suitable value for the axial spacing of the channels is 5 mm, for example. Depending on the belt used, other values are also possible. It is possible that a respective axial spacing between an outermost channel and a front edge of the pulley deviates from the axial spacing between adjacent channels, for example is greater than this. For example, the axial spacing between a channel center of the outermost channel and the front edge of the pulley may be at least 6 mm, in particular at least 7 mm.

According to one embodiment, the height of the channels is between 2 mm and 3 mm. As already described above, the height of the channels may be dimensioned starting from the base of the groove.

According to one embodiment, the depth of the groove is more than 0.5 mm. For example, the depth of the groove may be at least 1 mm. However, the depth of the groove may also be less than 1 mm.

According to one embodiment, a diameter of the pulley is at least 120 mm. Suitable values for a (guide) diameter of the pulley are, for example, 125 mm and 150 mm. Depending on the purpose, other values are also possible. The diameter of the pulley may also be significantly smaller than 120 mm.

According to one embodiment, the groove has a rectangular cross section. Walls that laterally delimit the groove may be substantially straight in cross section and aligned parallel to one another and preferably parallel to a plane that is orthogonal to the axis of rotation of the pulley. A base delimiting the groove in the radial direction may likewise be substantially straight in cross section and run parallel to the axis of rotation of the pulley. A fillet may be provided at a transition between the walls and the base. The fillet generally has significantly smaller dimensions than the walls and base.

According to one embodiment, the two channel flanks are aligned at an angle of at least 90 degrees to one another. This angle may also be referred to as the opening or wedge angle. With an opening or wedge angle of 90 degrees, for example, each of the channel flanks may enclose an angle of 45 degrees with the axis of rotation. For example, the opening or wedge angle may be in a range from 90 to 150 degrees. Alternatively, opening or wedge angles of less than 90 degrees are also possible.

According to one embodiment, the two channel flanks are each designed to be planar. In other words, the channel flanks may run in a straight line when viewed in cross section. Such planar channel flanks are relatively easy to implement when manufacturing the pulley. Channels having planar flanks are sometimes also referred to as v shaped.

According to one embodiment, the two channel flanks are each designed to be curved. In other words, viewed in cross section, the channel flanks may run in a curved manner, for example in the shape of an arc, a semicircle or a segment of a circle. The channel flanks may be curved inwards or outwards.

According to one embodiment, a tangent angle of a tangent applied to the channel flanks relative to an axis of rotation of the pulley is at least 35 degrees. This tangent angle may also be referred to as a climbing angle. This is the flattest angle of the tangent where the belt engages and from there ascends the channel. If the channel profile is otherwise unchanged, the climbing angle may be increased, for example, by widening the groove, i.e., by undercutting the curved channel flanks.

According to one embodiment, the ribs of the belt and/or the channels of the pulley are designed in such a way that the ribs touch the at least one pulley predominantly or substantially on the channel flanks. In particular, the belt and the pulley may be adapted to one another with regard to their cross-sectional geometries in such a way that the ribs of the belt lie against the channel flanks, but do not touch the surface of the pulley in the region of the grooves, or at least touch with at most a small surface area, which is small in relation to the surface of the channel flanks, and/or touch with a contact pressure that is low in relation to a contact pressure in the region of the channel flanks. As a result, uncontrolled force transmission via the base of the channel may be avoided.

It must be noted that some of the possible features and advantages of the invention are described herein with reference to different embodiments of the pulley on the one hand and the device or elevator system equipped with the pulley on the other hand. A person skilled in the art will recognize that the features may be suitably combined, adapted or replaced in order to arrive at further embodiments of the invention.

Embodiments of the invention will be described below with reference to the accompanying drawings; neither the drawings nor the description should be interpreted as limiting the invention.

The drawings are merely schematic and not to scale. In the different drawings, identical reference signs denote identical or similar features.

DETAILED DESCRIPTION

Figure 1:
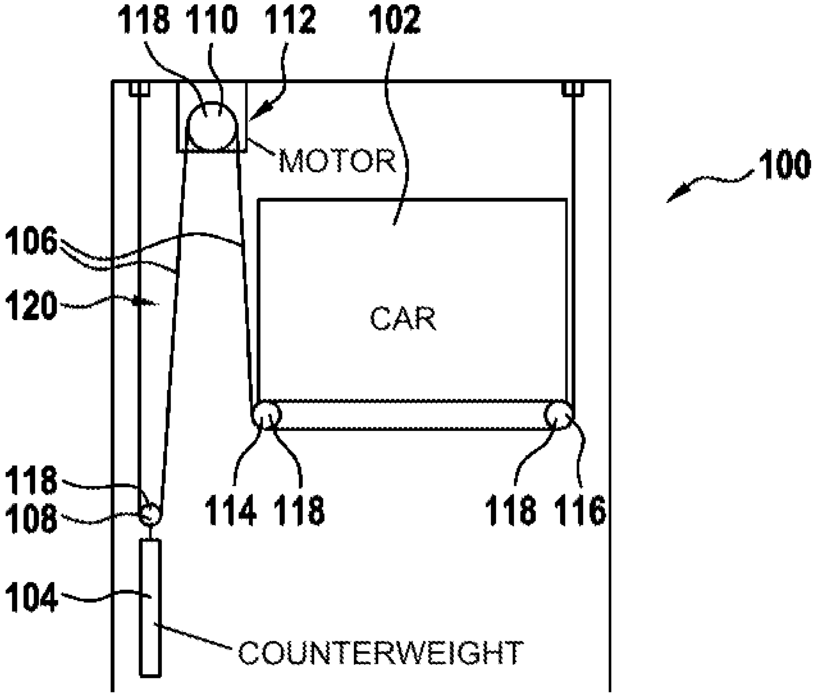
FIG. 1 shows an elevator system according to one embodiment of the invention.

FIG. 1 shows a highly simplified representation of an elevator system 100. The elevator system 100 comprises a car 102 and a counterweight 104 which are carried by a belt 106. For example, the two ends of the belt 106 are fixed to a shaft ceiling of the elevator system 100. Between its two ends, the belt 106 is guided over a counterweight pulley 108 from which the counterweight 104 is suspended, a traction sheave 110 coupled to a motor 112, a first car pulley 114 and a second car pulley 116. The two car pulleys 114, 116 are attached to the car 102. The counterweight pulley 108, the traction sheave 110, the first car pulley 114 and the second car pulley 116 are each designed as a pulley 118 with a special channel profile, as will be described in more detail below. By rotating the traction sheave 110, the belt 106 is moved in the direction of its longitudinal axis, as a result of which the heights of the elevator car 102 and of the counterweight 104 change. The driving force is applied by frictional engagement between the traction sheave 110 and the belt 106.

The pulleys 118 together with the belt 106 form a device 120 for carrying the car 102 and the counterweight 104. The device 120 may also comprise more than one belt 106.

Alternatively, the elevator system 100 may also be designed without the counterweight 104.

Figure 2:
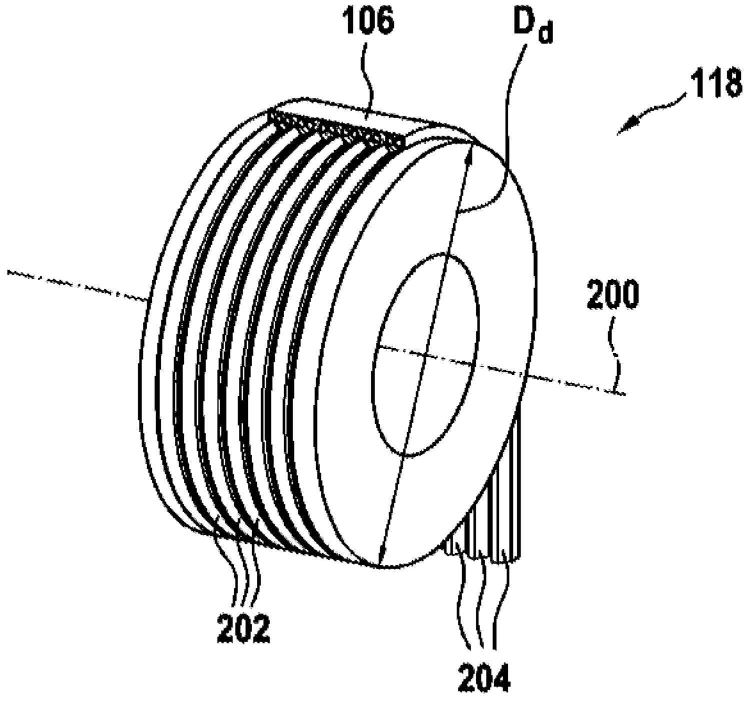
FIG. 2 shows a pulley from FIG. 1.

FIG. 2 shows a perspective view of a pulley 118 from FIG. 1. The pulley 118 may be rotated about an axis of rotation 200 and has a plurality of peripheral channels 202 spaced axially apart from one another on its lateral surface. A portion of the belt 106 is also shown, which is designed with a plurality of ribs 204 extending in the longitudinal direction of the belt 106. The ribs 204 each engage in one of the channels 202 in a region of the pulley 118 wrapped around by the belt 106. The contours of the channels 202 and the ribs 204 may be complementary to each other. For example, the channels 202 and the ribs 204 may each form a wedge-shaped profile.

A guide diameter $D_a$ of the pulley 118 is, for example, between 52 and 150 mm, in particular between 80 and 100 mm and preferably 87 mm.

Figure 3:
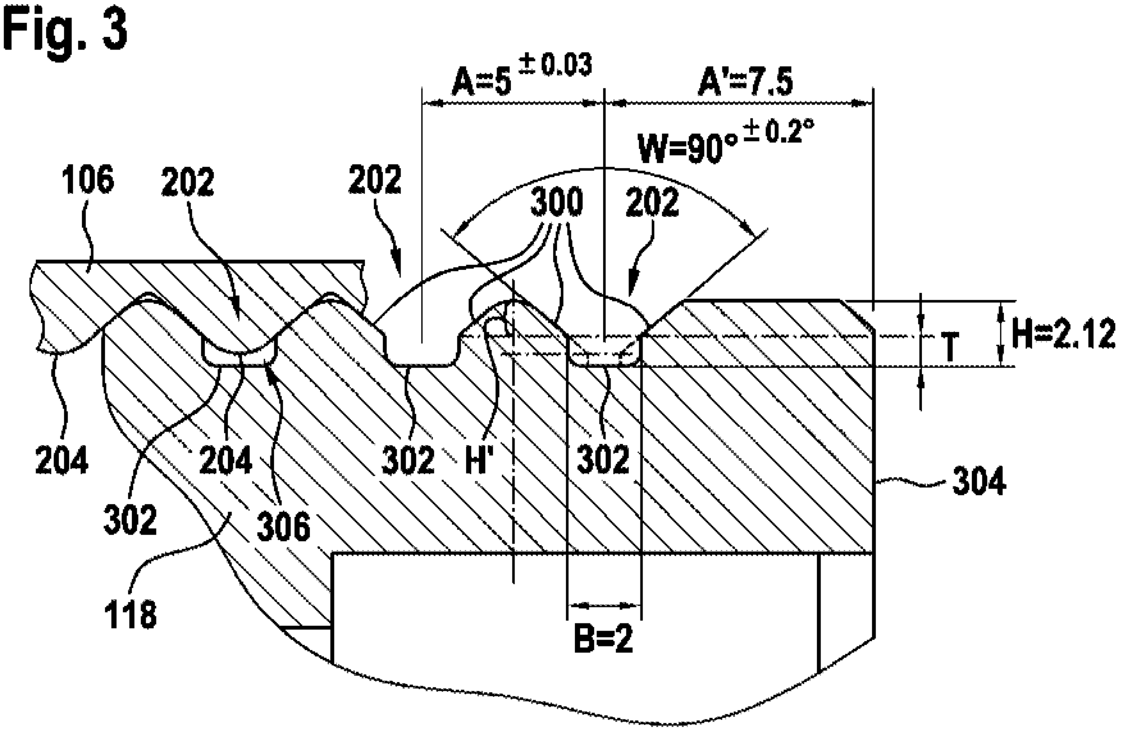
FIG. 3 shows a cross-sectional view of a portion of the pulley from FIG. 2.

FIG. 3 shows a cross-sectional view of a portion of the pulley 118 of FIG. 2. A profile of the channels 202 can be seen. Also shown is a portion of the belt 106 which engages in one of the channels 202 with one of its ribs 204.

Each of the channels 202 has two channel flanks 300 lying opposite one another. The channel flanks 300 are used for the frictional force transmission between the pulley 118 and the belt 106, wherein the ribs 204 each touch the channel flanks 300 with their rib flanks.

Figure 5:
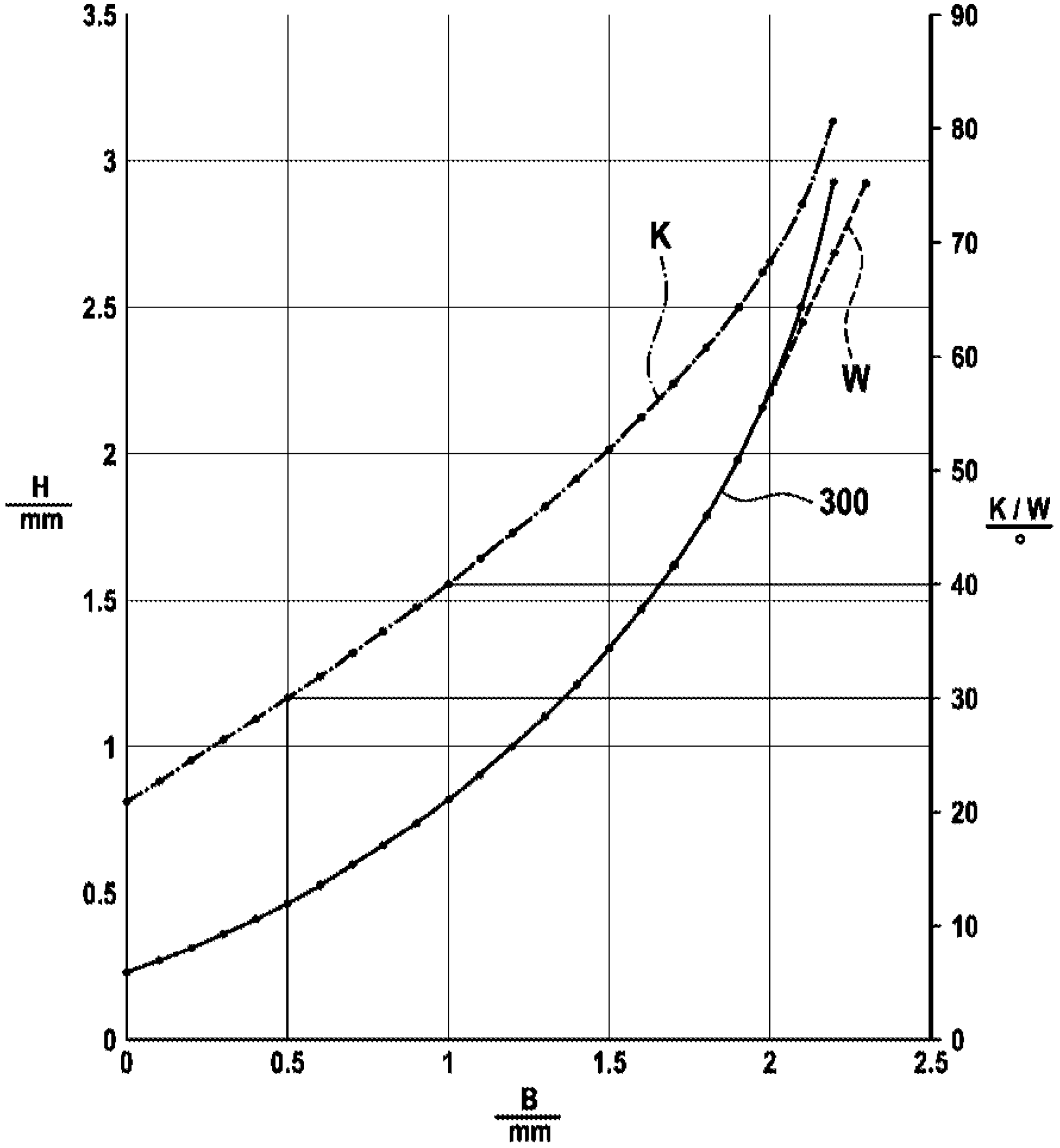
FIG. 5 shows a diagram representing a possible geometry of a curved channel flank according to an embodiment of the invention.

In this example, the channel flanks 300 run in a straight line and enclose a wedge or opening angle W of 90 degrees plus/minus 0.2 degrees. Alternatively, the channel flanks 300 may be designed in the shape of an arc, a segment of a circle or a semicircle, as shown in FIG. 5, and/or can be aligned at an opening angle W that differs from 90 degrees with respect to one another.

Between the two channel flanks 300 of a channel 202, there runs a groove 302 which forms a channel base of the channel 202 and undercuts the channel flanks 300. The groove 302 may completely encircle the pulley 118.

The channel profile is selected such that a width B of the groove 302 is at least 25 percent of an axial spacing A of the channels 202 and at least 80 percent of a height H of the channels 202. For example, as indicated in FIG. 3, the width B may be 2 mm, with a spacing A of 5 mm plus/minus 0.03 mm and a height H of 2.12 mm. However, as described above, numerous other combinations of A, B and H are also possible.

By dimensioning the groove 302 in this way, a projected height H' of the channel flanks 300, and thus a contact surface of the ribs 204, at a given height H compared to an embodiment with a narrower groove (indicated with dashed lines) may be reduced to an extent relevant for a diagonal pull behavior of the belt 106.

A spacing A' between a channel center of an outermost channel 202 and a front edge 304 of the pulley 118 is specified here as 7.5 mm, for example.

A depth T of the groove 302 may be greater than 0.5 mm. In FIG. 3, the depth T is about 1 mm.

As shown by way of example in FIG. 3, the groove 302 may have a rectangular cross section. The corners of the groove 302 may be rounded.

It can also be seen in FIG. 3 that the ribs 204 together with the grooves 302 each enclose a cavity 306, i.e. the ribs 204 do not touch a respective base of the grooves 302 when the belt 106 is loaded. The force transmission therefore takes place exclusively via the channel flanks 300.

Figure 4:
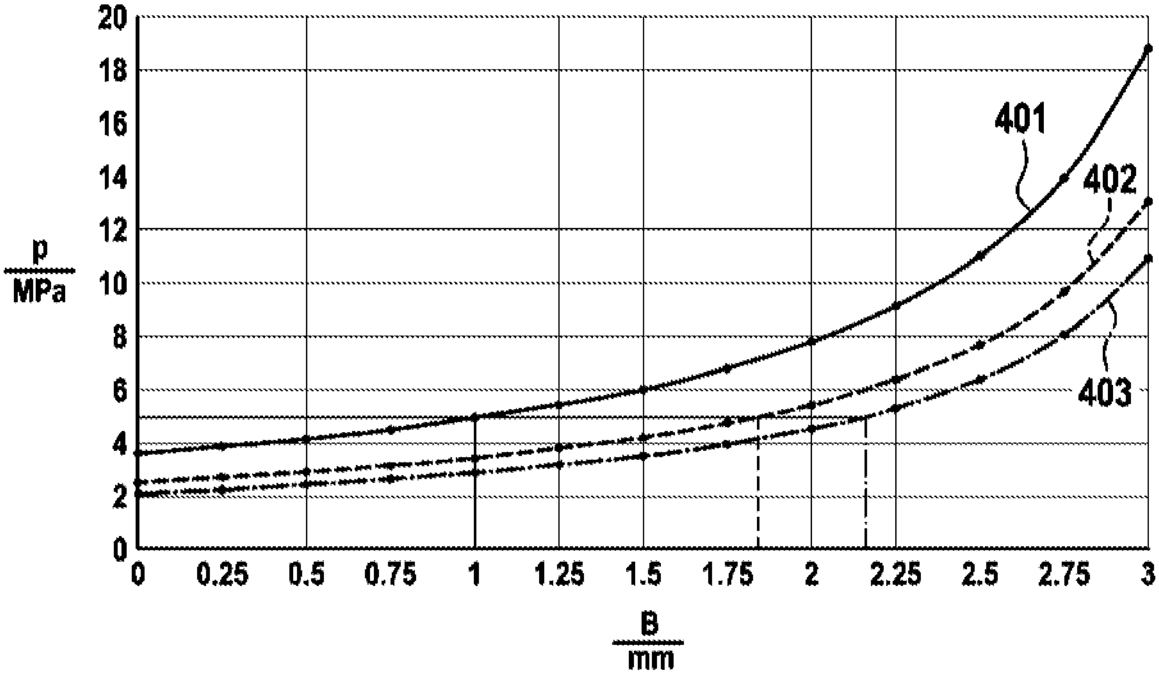
FIG. 4 shows a diagram illustrating surface pressures for different diameters of the pulley from FIG. 2.

FIG. 4 uses a diagram to illustrate the influence of the width B on a surface pressure p between the channel flanks 300 and the ribs 204. A scale of width B comprises values between 0 and 3 mm. Shown are a first curve 401, which represents the surface pressure p on a pulley 118 having a guide diameter $D_d$ of 87 mm, a second curve 402, which represents the surface pressure p on a pulley 118 having a guide diameter $D_d$ of 125 mm, and a third curve 403, which represents the surface pressure p on a pulley 118 having a guide diameter $D_d$ of 150 mm.

It can be seen that, in order to achieve a surface pressure p of approximately 5 MPa, a width B of 1 mm is required for $D_d$=87 mm, a width B of 1.8 mm is required for $D_d$=125 mm and a width B of 2.2 mm is required for $D_d$=150 mm.

FIG. 5 shows a diagram that illustrates a possible geometry of a curved channel flank 300. In addition, a curve is drawn that indicates a climbing angle K for each point of the channel flank 300, i.e. a tangent angle which encloses a tangent applied to this point with the axis of rotation 200 (here with an abscissa). The width B, starting from a central axis of the channel 202, is plotted on the abscissa. The central axis here corresponds to a left ordinate that intersects the abscissa at B=0 and on which the height H is plotted. The climbing angle K or the opening angle W is plotted on a right-hand ordinate.

The climbing angle K may be interpreted as a measure of the tendency of the belt 106 to climb out of the channels 202 in the event of lateral forces. The larger the climbing angle K, i.e. the more steeply the channel flanks 300 rise, the lower the tendency of the belt 106 to climb. With a groove or an undercut with a width of B=2 mm, a climbing angle K of about 40 degrees may be achieved, for example. On the other hand, a climbing angle K of only about 30 degrees may be achieved with a groove or an undercut with a width of B=1 mm.

Finally, it should be noted that terms such as “comprising,” “including,” etc. do not exclude other elements or steps, and terms such as “a” or “an” do not exclude a plurality. Furthermore, it should be noted that features or steps that have been described with reference to one of the above embodiments may also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A pulley for guiding a belt for carrying a car and/or a counterweight of an elevator system, the pulley comprising:

the pulley having a lateral surface extending around a periphery of the pulley with a plurality of peripheral, spaced channels formed in the lateral surface for accommodating ribs of the belt, the channels being axially spaced along an axis of rotation of the pulley;

wherein each of the channels has two opposing channel flanks for force transmission by frictional engagement with one of the ribs and a peripheral groove extending between the two channel flanks, the groove adjoining the two channel flanks and having a bottom extending parallel to the axis of rotation of the pulley, the bottom of the groove being spaced from the two channel flanks and forming a bottom of the channel;

wherein a width of the bottom of the groove is at least 25 percent of an axial spacing of the channels and at least 80 percent of a height of the channels; and wherein the two opposing channel flanks form a wedge-shaped profile of each of the channels and the channel flanks run in a straight line.

2. The pulley according to claim 1 wherein the width of the groove is between 1 mm and 3 mm.

3. The pulley according to claim 1 wherein the axial spacing of the channels is between 4 mm and 6 mm.

4. The pulley according to claim 1 wherein the height of the channels is between 2 mm and 3 mm.

5. The pulley according to claim 1 wherein a depth of the groove is greater than 0.5 mm.

6. The pulley according to claim 1 wherein a diameter of the pulley is between 52 mm and 150 mm.

7. The pulley according to claim 6 wherein the diameter of the pulley is between 80 mm and 100 mm.

8. The pulley according to claim 7 wherein the diameter of the pulley is 87 mm.

9. The pulley according to claim 1 wherein the groove has a rectangular cross section with corners of the groove being rounded.

10. The pulley according to claim 1 wherein the two opposing channel flanks are oriented at an angle of at least 90 degrees to one another.

11. The pulley according to claim 1 wherein the two opposing channel flanks are each planar.

12. The pulley according to claim 1 wherein the two opposing channel flanks are each curved.

13. The pulley according to claim 12 wherein a climbing angle of the channel flanks relative to the axis of rotation of the pulley is at least 35 degrees.

14. A device for carrying a car and/or a counterweight of an elevator system, the device comprising:
at least one belt having a plurality of ribs extending in a longitudinal direction of the belt; and
at least one pulley according to claim 1, wherein the at least one belt at least partially wraps around the at least one pulley and each of the ribs is received by an associated one of the channels of the pulley.

15. The device according to claim 14 wherein the ribs and/or the channels are formed such that the ribs touch the at least one pulley exclusively on the channel flanks of the channels.

16. An elevator system comprising:
an elevator car;
a counterweight; and
the device according to claim 14 wherein the car and/or the counterweight is carried by the at least one belt of the device.

17. A pulley for guiding a belt for carrying a car and/or a counterweight of an elevator system, the pulley comprising:
the pulley having a lateral surface extending around a periphery of the pulley with a plurality of peripheral, axially spaced channels formed in the lateral surface for accommodating ribs of the belt, wherein an axial spacing of the channels is between 4 mm and 6 mm;
wherein a diameter of the pulley is between 52 mm and 150 mm;
wherein each of the channels has two opposing channel flanks for force transmission by frictional engagement with one of the ribs and a peripheral groove between the two channel flanks, wherein a width of the groove is between 1 mm and 3 mm, a height of the channels is between 2 mm and 3 mm, and a depth of the groove is greater than 0.5 mm; and
wherein the two opposing channel flanks form a wedge-shaped profile of each of the channels and the channel flanks run in a straight line.

18. A pulley for guiding a belt for carrying a car and/or a counterweight of an elevator system, the pulley comprising:
the pulley having a lateral surface extending around a periphery of the pulley with a plurality of peripheral, axially spaced channels formed in the lateral surface for accommodating ribs of the belt;
wherein each of the channels has two opposing channel flanks for force transmission by frictional engagement with one of the ribs, the two opposing channel flanks having a wedge-shaped truncated cone profile forming an outer portion of the channel, and a peripheral groove forming an inner portion of the channel adjoining the two channel flanks as an undercut region; and
wherein the groove has opposed wall surfaces extending orthogonal to an axis of rotation of the pulley and connecting the channel flanks with a bottom of the groove, and wherein a width of the groove between the wall surfaces is at least 25 percent of an axial spacing of the channels and at least 80 percent of a height of the channels from the lateral surface to the bottom of the groove.

* * * * *